(12) United States Patent
Watson

(10) Patent No.: US 10,667,624 B2
(45) Date of Patent: Jun. 2, 2020

(54) ZIP-AWAY COVER

(71) Applicant: Keely Watson, San Diego, CA (US)

(72) Inventor: Keely Watson, San Diego, CA (US)

( * ) Notice: Subject to any disclaimer, the term of this patent is extended or adjusted under 35 U.S.C. 154(b) by 87 days.

(21) Appl. No.: 15/813,031

(22) Filed: Nov. 14, 2017

(65) Prior Publication Data
US 2019/0142182 A1 May 16, 2019

(51) Int. Cl.
*A47C 31/11* (2006.01)
*B60N 2/60* (2006.01)
*A47C 7/62* (2006.01)

(52) U.S. Cl.
CPC .............. *A47C 31/11* (2013.01); *A47C 7/386* (2013.01); *A47C 7/62* (2013.01); *B60N 2/60* (2013.01); *B60N 2/6063* (2013.01)

(58) Field of Classification Search
CPC ....... A47C 31/11; A47C 7/386; B60N 2/6027; B60N 2/60; B60N 2/6018–609; B60N 2/6063
USPC .................................................. 297/220, 392
See application file for complete search history.

(56) References Cited

U.S. PATENT DOCUMENTS

| 3,578,383 | A | * | 5/1971 | Earl | A47C 7/383 |
| | | | | | 297/391 |
| 3,608,964 | A | * | 9/1971 | Earl | A47C 7/383 |
| | | | | | 297/397 |
| 6,393,638 | B1 | * | 5/2002 | MacColl | A45F 4/02 |
| | | | | | 383/4 |
| 6,786,547 | B1 | * | 9/2004 | Chu | B60N 2/5858 |
| | | | | | 297/220 |
| 7,204,551 | B2 | * | 4/2007 | Kahan | A47C 31/113 |
| | | | | | 297/184.11 |
| 7,225,483 | B1 | * | 6/2007 | Remblad | A45F 4/06 |
| | | | | | 383/4 |
| 7,665,804 | B1 | * | 2/2010 | Jeffrey | A47C 7/386 |
| | | | | | 297/219.1 |
| 7,726,735 | B2 | * | 6/2010 | Resendez | B60N 2/6063 |
| | | | | | 297/228.11 |
| 7,779,492 | B2 | * | 8/2010 | Mangano | A47C 7/383 |
| | | | | | 5/417 |
| 2011/0068136 | A1 | * | 3/2011 | Lin | A45C 7/0077 |
| | | | | | 224/259 |
| 2012/0200130 | A1 | * | 8/2012 | Brinker | A47C 31/11 |
| | | | | | 297/220 |
| 2013/0320720 | A1 | * | 12/2013 | Steinmetz | A47C 7/62 |
| | | | | | 297/219.1 |
| 2015/0115674 | A1 | * | 4/2015 | Watson | A47C 31/11 |
| | | | | | 297/220 |

* cited by examiner

*Primary Examiner* — David R Dunn
*Assistant Examiner* — Tania Abraham
(74) *Attorney, Agent, or Firm* — Kilpatrick Townsend & Stockton LLP

(57) ABSTRACT

A cover for creating a sterile sitting environment is provided. The cover includes a front, a side, and the back. The front and the back are connected by the side so as to create an internal volume bounded by the front, the back, and the side, which internal volume is accessible via an opening. The back of the cover can be larger than the front of the cover. The back of the cover can include a central opening. The central opening can be sized and shaped to allow a user to access a portion of a seat, such as a media device, through the central opening. The cover can include a support member positionable below the back.

19 Claims, 6 Drawing Sheets

ZIP-AWAY COVER

BACKGROUND

Goods and services are frequently provided which require and/or allow an individual or a customer to sit. Frequently, a chair, or other piece of furnishing is provided for the individual to sit on. While the comfort of these furnishings has increased, these furnishings are frequently not clean or hygienic. In light of this, new devices, methods, and systems are required to provide for increased comfort and cleanliness of furnishings

BRIEF SUMMARY

One aspect of the present disclosure relates to a seat cover. The seat cover includes: a headrest having a front face, a front interior, a front top, a front base, a front first side, and a front second side; a back having a rear face defining an opening, a back interior, a back top, a back base, a back first side, and a back second side; a side connecting the headrest and the back and extending around the front first side, the front top, the front second side, the back first side, the back top, and the back second side; and a fastener system extending around portions of the front. In some embodiments, the fastener system is moveable between a first, closed position and a second, open position. In some embodiments, the fastener system is moveable to the first closed position when the headrest and the side are received within a volume defined by the back of the seat cover. In some embodiments, the headrest, the back, and the side define an internal volume having an opening at the base of the headrest and the back of the seat cover.

In some embodiments, the fastener system can be a zipper. In some embodiments, the zipper can include: a first zipper half extending around portions of three of the front top, the front base, the front first side, and the front second side; and a second zipper half extending around portions of three of the front top, the front base, the front first side, and the front second side. In some embodiments, the first and second zipper halves are positioned so that at least one of the zipper halves extends around portions of each of the front top, the front bottom, the front first side, and the front second side. In some embodiments, the first zipper half extends around a first half of the perimeter of the front of the seat cover and the second zipper half extends around a second half of the perimeter of the front of the seat cover.

In some embodiments, the headrest is smaller than the back. In some embodiments, the back defines a central opening, wherein a portion of the seat is accessible through the central opening. In some embodiments, at least one of the headrest, the back, and the side comprises an elastic material. In some embodiments, at least one of the headrest, the back, and the side comprises an antimicrobial material. In some embodiments, at least one of the headrest, the back, and the side comprise poly-spandex.

One aspect of the present disclosure relates to a method of creating a sterile sitting environment. The method includes obtaining a seat cover including: a headrest having a front face, a front interior, a front top, a front base, a front first side, and a front second side; a back having a back face, a back interior, a back top, a back bottom, a back first side, and a back second side; a side connecting the headrest and the back and extending around the front first side, the front top, the front second side, the back first side, the back top, and the back second side, which headrest, back, and side define an internal volume opening at the base of the headrest and the back of the seat cover; and a fastener system extending around portions of the front, wherein the fastener system is moveable between a closed position and an open position. In some embodiments, the fastener system is moveable to the closed position when the back and the side are received within a volume defined by the headrest. The method includes: moving the fastener system from the closed position to the open position; and placing the seat cover over a top portion of a seat.

In some embodiments, placing the seat cover of the top portion of the seat includes removing the back and the side from the volume defined by the headrest of the seat cover. In some embodiments, placing the seat cover of the top portion of the seat further includes receiving the top of the seat within the internal volume defined by the headrest, the back, and the side. In some embodiments, receiving the top of the seat within the internal volume defined by the headrest, the back, and the side includes inserting the top of the seat through the internal volume opening at the base of the headrest and the back of the seat cover.

In some embodiments, the method includes removing the seat cover from the top portion of the seat. In some embodiments, the method includes placing the back and the side of the seat cover in the volume defined by the headrest of the seat cover, and moving the fastener from the open position to the closed position. In some embodiments, the method includes positioning a central opening defined by the back of the seat cover over a media device on the seat such that the media device is accessible and viewable through the central opening.

One aspect of the present disclosure relates to a seat cover including: a headrest having a front top, a front base, a front first side, and a front second side; a back having a back top, a back base, a back first side, and a back second side, which back is smaller than the headrest; a side connecting the headrest and the back and extending around the front first side, the front top, the front second side, the back first side, the back top, and the back second side, which headrest, back, and side define an internal volume opening at the base of the headrest and the back of the seat cover; and a zipper extending around the perimeter of the headrest of the seat cover, the zipper having a first half extending around portions of three of the front top, the front base, the front first side, and the front second side, and a second half extending around portions of three of the front top, the front base, the front first side, and the front second side. In some embodiments, the zipper is moveable between a closed position and an open position. In some embodiments, the zipper is moveable to the closed position when the back and the side are within a volume defined by the headrest of the seat cover.

In some embodiments, the first and second zipper halves are positioned so that at least one of the zipper halves extends around portions of each of the front top, the front base, the front first side, and the front second side. In some embodiments, at least one of the headrest, the back, and the side is made of poly-spandex.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

The present disclosure is described in conjunction with the appended figures.

Figure 1A:
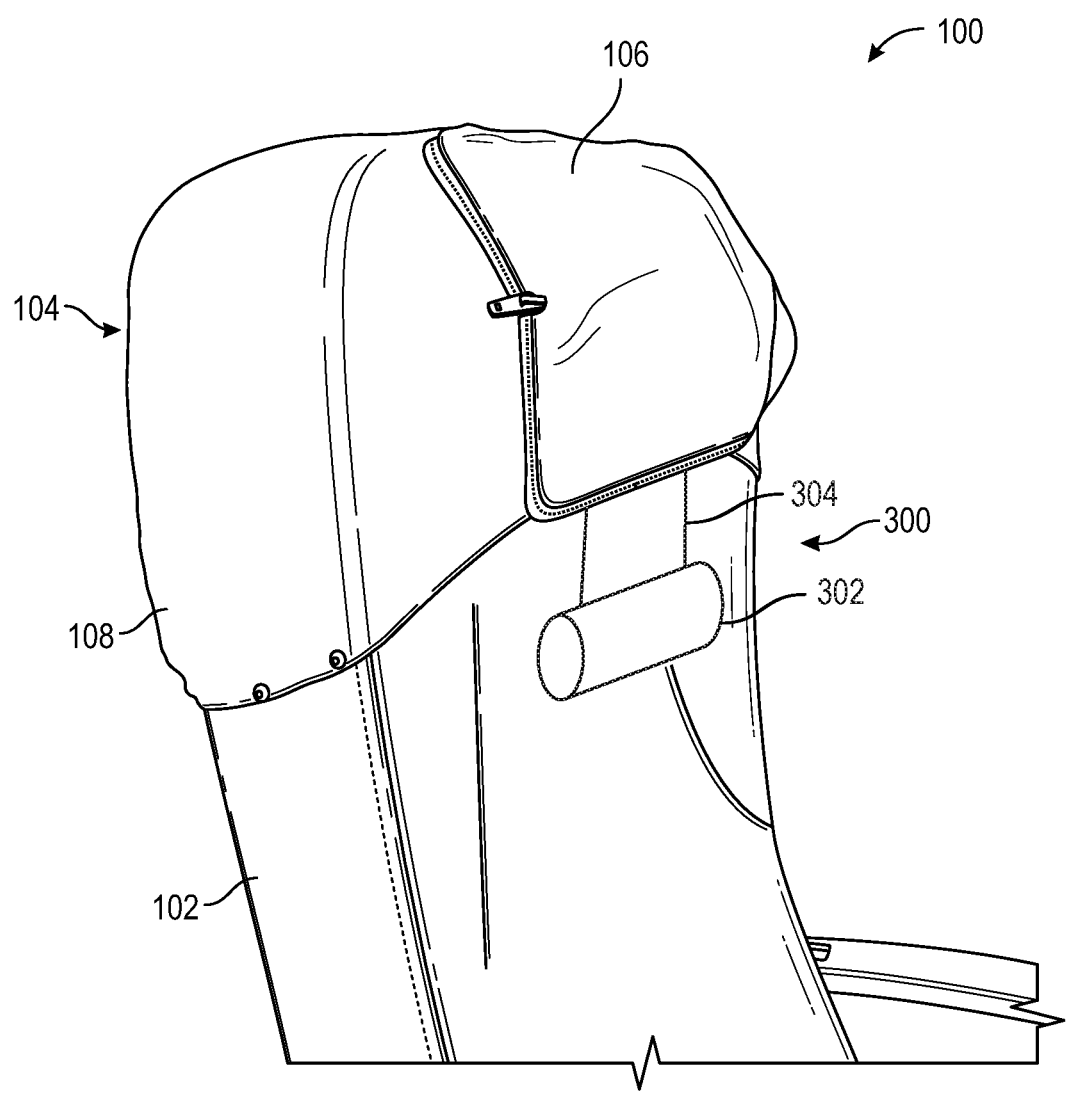
FIGS. 1A-1C are views of one embodiment of a cover in a first, open position.

In the appended figures, similar components and/or features may have the same reference label. Where the reference label is used in the specification, the description is applicable to any one of the similar components having the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In some embodiments, the present disclosure relates to a cover that can be placed on, for example, a headrest. In some embodiments, the cover can include a front piece, a back piece, and a side piece. In one embodiment, the front piece in the back piece can have a corresponding top, bottom, first side, and second side. The side piece can connect the front and the back pieces, and specifically can be connected to the first sides, the tops, and the second sides of the front and the back pieces. In some embodiments, the bottoms of the front and the back pieces are not connected so that the front, back, and side pieces define an opening through which an internal volume defined by the front, back, and the side pieces can be accessed. In one embodiment, the back piece can be larger than the front piece.

In some embodiments, a fastener can extend around the perimeter portions of the front piece. The fastener can be, for example, the mechanical fastener such as one or several hook and loop fasteners, one or several snaps, one or several buttons, one or several zippers, or the like. In some embodiments, the cover can be moved between a first, open position and a second, closed position. In one embodiment, the cover is placed in a second, closed position when the front piece defines a receiving volume within which the front and side pieces are received. In some embodiments, the fastener can secure the cover in the second, closed position, and in one specific embodiment in which the fastener is a zipper, the zipper can be moved from a first position in which the zipper is open to a second position in which the zipper is closed to secure the cover in the second, closed position. As positioned around the front, the fastener can irritate the passenger when the passenger rests his head on the cover.

The back of the cover can include a central opening. The central opening can be sized and shaped so as to allow access through the central opening of a portion of the seat otherwise underneath the cover. This access can be particularly advantageous when the seat includes a media device such as for providing in-fight entertainment. The cover and the central opening can be positioned such that this media device is accessible and viewable through the central opening.

In some embodiments, the present disclosure relates to a process for separating a user from portions of the seat. This process can include unfastening the fastener, moving the cover from the second, closed position to the first, open position, orienting the cover so that the opening of the cover is proximate to the headrest of the seat, inserting the headrest of the seat through the opening of the cover and into the internal volume of the cover, and securing the positioning of the cover on the headrest of the seat via the constrictor.

With reference now to FIG. 1A, a perspective view of one embodiment of a seat cover 100 on a chair 102 is shown. The seat cover 100 can be a variety of shapes and sizes and can be made from a variety of materials. In some embodiments, the seat cover 100 can be sized and shaped to fit over all or a portion of the seat 102 such as, for example, the headrest of a seat 102. In some embodiments, the seat cover 100 can be made of a flexible material that can allow the seat cover 100 to change shapes. In some embodiments, the seat cover 100 can be made of an elastic material to allow the seat cover 100 to change sizes, and in some embodiments, the seat cover can be made of an antimicrobial material to form a bacterial barrier. In one embodiment, for example, the seat cover 100 can be made of a fabric that can be flexible, elastic, and antimicrobial such as, for example, poly spandex.

The seat cover 100 can be used with any desired seat 102. The seat 102 can be, for example, a seat 102 and a public location, or a seat in a private location. In some embodiments, the seat 102 can be a seat on an airplane, a seat in a movie theater, or any other desired seat. In some embodiments, the seat 102 can have a headrest.

As seen FIG. 1, the seat cover 100 can include a back 104, a front 106, and a side 108 connecting the back 104 to the front 106. In some embodiments, the back 104, also called the headrest, can be a planar member that can have a variety of shapes and sizes. In the embodiment depicted in FIG. 1, the back 104 is an approximately rectangular shaped planar member. Similarly, in some embodiments, the front 106 can be a planar member that can have a variety of shapes and sizes. In the embodiment depicted in FIG. 1, the front 106 is an approximately rectangular shaped planar member. The side 108 can have a variety of shapes and sizes. In the embodiment depicted in FIG. 1, the side piece is an approximately U-shaped member extending around portions of both the back 104 and the front 106.

Figure 1B:
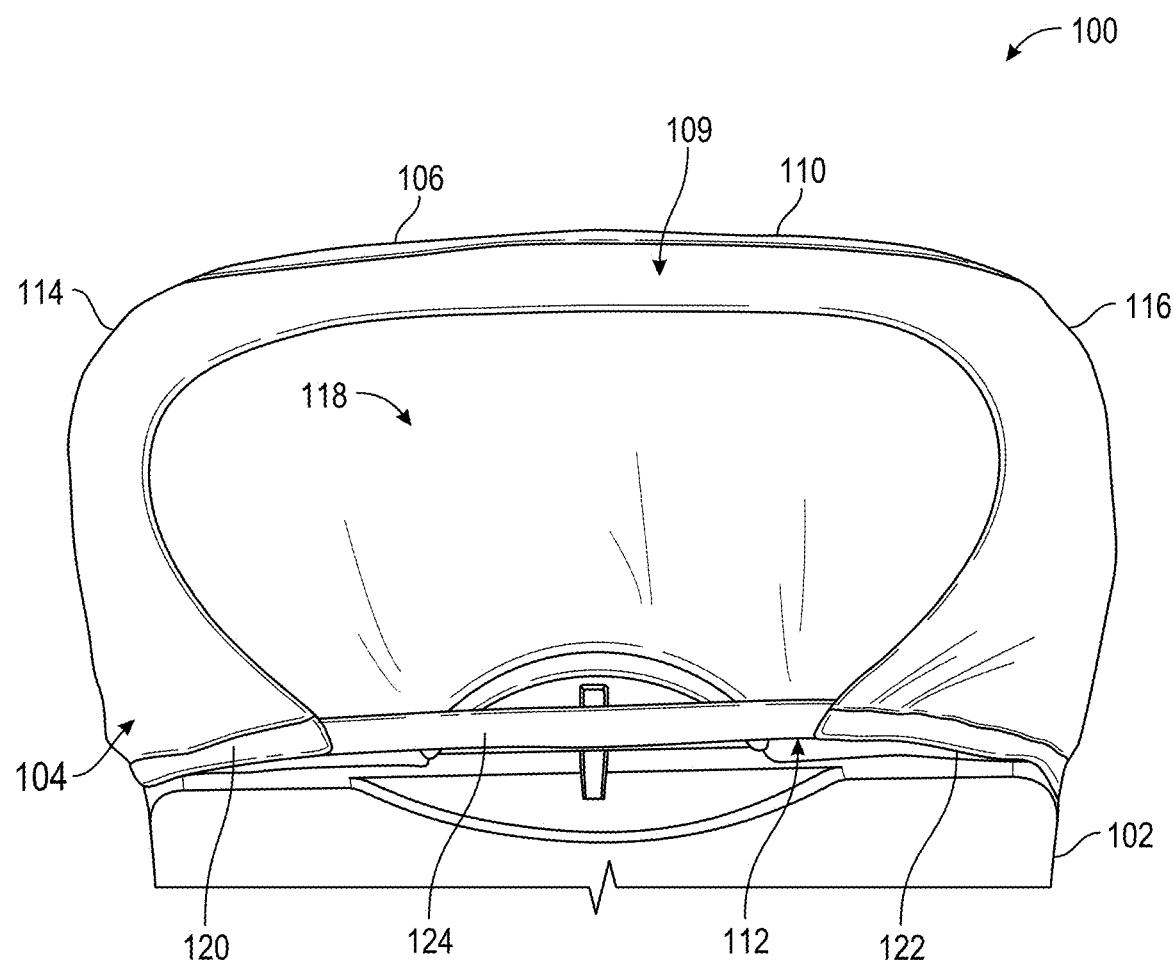

With reference now to FIG. 1B, a back view of one embodiment of the cover 100 is shown. As seen in FIG. 1B, the back 104 of the cover 100 includes a back face 109, also referred to herein as a head interface and as a back external face, a back interior (not shown) located opposite the back face 109, a back top 110, a back base 112, a back first side 114, and a back second side 116. In some embodiments, the back 104 can have a height that is the shortest distance between the back top 110 and the back base 112 and a width that is the shortest distance between the back first side 114 and the back second side 116. In some embodiments, the height of the back 104 can be between, for example, 4 and 20 inches, 6 and 18 inches, 8 and 16 inches, and 10 and 14 inches, and in some embodiments, the height of the back 104 can be approximately 17.25 inches, 16.5 inches, 16.75 inches, 16 inches, 12.75 inches or approximately 12 inches. As used herein "approximately" can mean plus or minus one inch of the specified dimension, and/or +/−2%, 5%, 10%, 15% or any other or intermediate percent of the value with which the dimension is associated.

In some embodiments, back 104 can have a width of between 8 and 36 inches, 12 and 32 inches, and 16 and 28 inches, and in some embodiments, the width of the back 104 can be approximately 24 inches. In some embodiments, for example, the back 104 can have a trapezoidal shape such that the width of the back 104 at the back top 110 can be smaller than the width of the back 104 at the back base 112. In one embodiment, for example, the width of the back 104 at the back top 110 can be between 8 and 26 inches, between 10 and 24 inches, between 12 and 22 inches, and between 14 and 18 inches, and in some embodiments, the width of the back 104 at the back top 110 can be approximately 16 inches, or approximately 16.5 inches. In one embodiment, for example, the width of the back 104 at the back base 112 can be between 8 and 34 inches, between 11 and 31 inches, between 14 and 28 inches, between 17 and 25 inches, and between 20 and 22 inches, and in some embodiments, the width of the back 104 at the back base 112 can be approximately 21 inches.

In some embodiments in which the back 104 is rectangular shaped, the components of both of the pair of the back top 110 and the back base 112, and the pair of the back first side 114 and the back second side 116 are parallel and/or approximately parallel including, for example, within 30° of parallel, 20° of parallel, 15° of parallel, 10° of parallel, 5° of parallel, 1° of parallel, or any other or intermediate position.

In some embodiments, the back face 109 can wholly or partially define a central opening 118. The central opening 118 can allow access to a back portion of the seat 102 through the central opening 118. In some embodiments, for example, the central opening 118 can be sized and shaped to allow access to a media device located on the back portion of the seat 102 such as, for example, an in-flight entertainment device or system found on an airplane.

In the embodiment depicted in FIG. 1B, the back face 109 is U-shaped having a first leg 120 and a second leg 122. The U-shaped back face 109 partially defines the central opening 118. As further seen in FIG. 1B, a connecting member 124 extends from the first leg 120 to the second leg 122, thereby connecting the first leg 120 and the second leg 122 and, together with the back face 109, completely defines the central opening 118. The connecting member 124 can comprise the same material as the back face 109, or a different material than the back face 109. In some embodiments, for example, the connecting member 124 can comprise an elastic material that can allow a change in the distance between the first leg 120 and the second leg 122 via the stretching or relaxing of the connecting member 124. In some embodiments, the connecting member 124 can include one or several features that allow the user to control the length of the connecting member 124 and thereby the distance between the first leg 120 and the second leg 122. These features can include one or several buckles, clasps, fasteners, drawstrings, or the like.

Figure 1C:
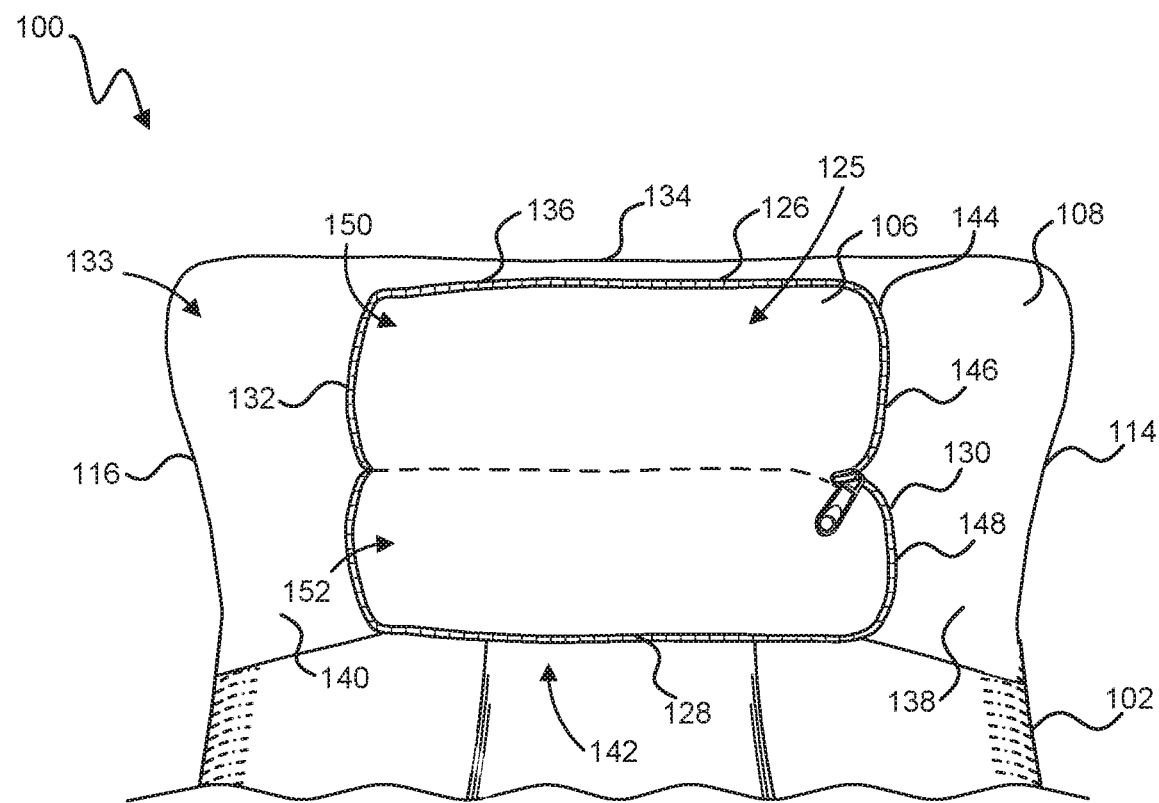

With reference now to FIG. 1C, a front view of one embodiment of the cover 100 on the seat 102 is shown. As seen in FIG. 1C, the front 106 includes a front face 125, also referred to herein as a front external face, a front interior (not shown) located opposite the front face 125, a front top 126, a front base 128 located opposite the front top 126, a front first side 130, and a front second side 132 located opposite the front first side 130. In the embodiment depicted in FIG. 1C, the shortest distance between the front top 126 and the front base 128 is the height of the front 106 which can be, for example, between 2 and 18 inches, 4 and 16 inches, 6 and 14 inches, and between 8 and 12 inches, and in some embodiments, the height of the front 106 can be approximately 10 inches or approximately 9 inches.

As depicted in FIG. 1C, the shortest distance between the front first side 130 and the front second side 132 is the width of the front 106 which can be, for example, between 4 and 20 inches, between 8 and 16 inches, and between 10 and 14 inches, and in some embodiments, the width of the front 106 can be approximately 12 inches, approximately 10 inches, or approximately 9.25 inches. In some embodiments, the height of the front 106 can be less than the height of the back 104 and/or the width of the front 106 can be less than the width of the back 104. In one embodiment, the height and/or width of the back 104 can be, for example, the same as the height and/or width of the front 106, and in some embodiments, the height and/or width of the back 104 can be 1.2, 1.4, 1.6, 1.8, 2, 2.5, 3, 4, 5, or any other or intermediate factor larger than the height and/or width of the front 106. In some embodiments, the area of the back 104 can be the same as, or larger than, the area the front 106. In one embodiment, for example, the area of the back 104 can be 1.5, 2, 2.5, 3, 4, 5, 6, or any other intermediate factor larger than the area of the front 106. In some embodiments, the front 106 can be positioned with respect to the back 104 such that the back top 110 is proximate to the front top 126, the back first side 114 is proximate to the front first side 130, the back base 112 is proximate to the front base 128, and the back second side 116 is proximate to the front second side 132.

As further seen in FIG. 1C, the side 108 includes a side face 133, a side interior (not shown) located opposite the face 133, a back edge 134, a front edge 136, a first end 138, and a second end 140. In some embodiments, the shortest distance between the back edge 134 and the front edge 136 can define a thickness of the side 108. In some embodiments, the thickness of the side can approximate the distance between the front and the back of the seat 102, and in some embodiments, this thickness can be approximately 12 inches, approximately 10 inches, approximately 8 inches, approximately 6 inches, approximately 4.25 inches, approximately 4 inches, approximately 2 inches, approximately 1 inch, or any other or intermediate value. In some embodiments, the approximate thickness can be within one inch of the above specified thickness.

In some embodiments, the back edge 134 and the front edge 136 can be parallel and/or approximately parallel, and in some embodiments, the first end 138 and the second end 140 can be nonparallel. In the depicted embodiment, the back edge 134 of the side 108 is connected to the back top 110, the back first side 114, and the back second side 116, and the front edge 136 of the side 108 is connected to the front top 126, the front first side 130, and the front second side 132.

As further depicted, and in some embodiments, the first end 138 and the second end 140 of the side 108 extend between the back 104 and the front 106 of the cover 100. In some embodiments, the first and second ends 136, 138 can extend between the intersection of the first or second sides 114, 116, 130, 132 and the base 112, 128 of the back 104 and the front 106. In some embodiments, the first and second ends 136, 138 can extend in a straight line, a curved line, or in any other desired fashion.

In some embodiments, the difference between the height of the back 104 and the height of the front 106 or combination of the height of the front 106 and the thickness of the side 108 can be approximately 18 inches, 16 inches, 14 inches, 12 inches, 10 inches, 8.25 inches, 8 inches, 7.75 inches, 7 inches, 6 inches, 4 inches, 3.75 inches, 3 inches, 2 inches, 1 inch, or any other or intermediate value.

In the embodiment depicted in FIG. 1C, the base 112, 128 of the back 104 and the front 106, and the first and second ends 138, 140 of the side 108 define an opening 142 in the cover 100. In some embodiments, the opening 142 can allow access to an internal volume of the cover 100, which internal volume is bounded by a combination of the opening, and the backs of the back 104, the front 106, and the side 108. In some embodiments, the opening 142 can be sized and shaped to receive a portion of the seat 102 such as, for example, the headrest, the headrest portion, and/or the top of the seat 102. In some embodiments, the size of the opening 142 can be controlled via the control of the distance between the first leg 120 and the second leg 122 such as, for example, by controlling the length of the connecting member 124.

In some embodiments, the front 106 can have a fastener system 144 located at and/or around the perimeter of the front 106. The fastener system 144 can be any feature that can be used to detachably connect portions of the perimeter of the front 106. In some embodiments, the fastener system 144 can be one or several mechanical fasteners such as, for example, one or several hook and loop fasteners, one or several buttons, one or several snaps, one or several zippers, and/or the like. In the specific embodiment depicted in FIG. 1C, the fastener system 144 is a zipper that extends around the perimeter of the front 106.

In some embodiments, the fastener system 144 can have a first piece 146 that mates to a second piece 148. In some embodiments, the first piece 146 of the fastener system 144 can be the first half of the zipper and the second piece 148 of the fastener system 144 can be the second half of the zipper. In some embodiments, the first piece 146 of the fastener system 144 extends around a first portion 150 of the front 106 of the cover 100 and the second piece 146 of the fastener system 144 extends around a second portion 152 of the front 106 of the cover 100. In some embodiments, the first portion 150 can be any piece of the front 106 of the cover 100 and can be, for example, defined by portions of at least three of the top 126, the base 128, the first side 130, and the second side 132 of the front 106. In some embodiments, the second portion 152 can be any piece of the front 106 of the cover 100 and can be, for example, defined by portions of at least three of the top 126, the base 128, the first side 130, and the second side 132 of the front 106.

In some embodiments, the first piece 146 of the fastener system 144 extends around all or portions of the first and second sides 130, 132 and the top 126 of the front 106 and the second piece 148 of the fastener system 144 extends around all or portions of the first and second sides 130, 132 and the base 128 of the front 106. In some embodiments, the front 106 can be moved from a first, open position to a second, closed position and the fastener system 144 can, when the front 106 is in the second, closed position, connect the first portion 150 to the second portion 152 of the front 106. In some embodiments, for example, in which the fastener system 144 is a zipper, the zipper can connect the first portion 150 to the second portion 152 of the front 106 by moving the slider of the zipper from a first, unfastened position to a second, fastened position.

In some embodiments, and as shown in FIG. 1A, the seat cover 100 can include a support member 300 that can include a cushion 302 and a connector 304. In some embodiments, the cushion 302 can be detachably connected to the seat cover 100 via the connector such that, when the seat cover 100 is positioned over the seat 102, the cushion 302 is positionable below the back 104 of the seat cover 100. In some embodiments, the support member 300 can be connected to the back 104 of the seat cover 100, and in some embodiments, the support member 300 can be connected to the front 106 of the seat cover 100. The cushion 302 can comprise a variety of shapes and sizes. In some embodiments, the cushion 302 can comprise a variety of thicknesses to provide for customizable cushioning. In some embodiments, the connector 304 can comprise a variety of lengths. In some embodiments, for example, the connector 304 can be longer, and in some embodiments, the connector 304 can be shorter. In some embodiments, the different lengths of the connector 304 can allow customizing of the positioning of the cushion 302 with respect to the back 104 of the seat cover 100.

Figure 2:
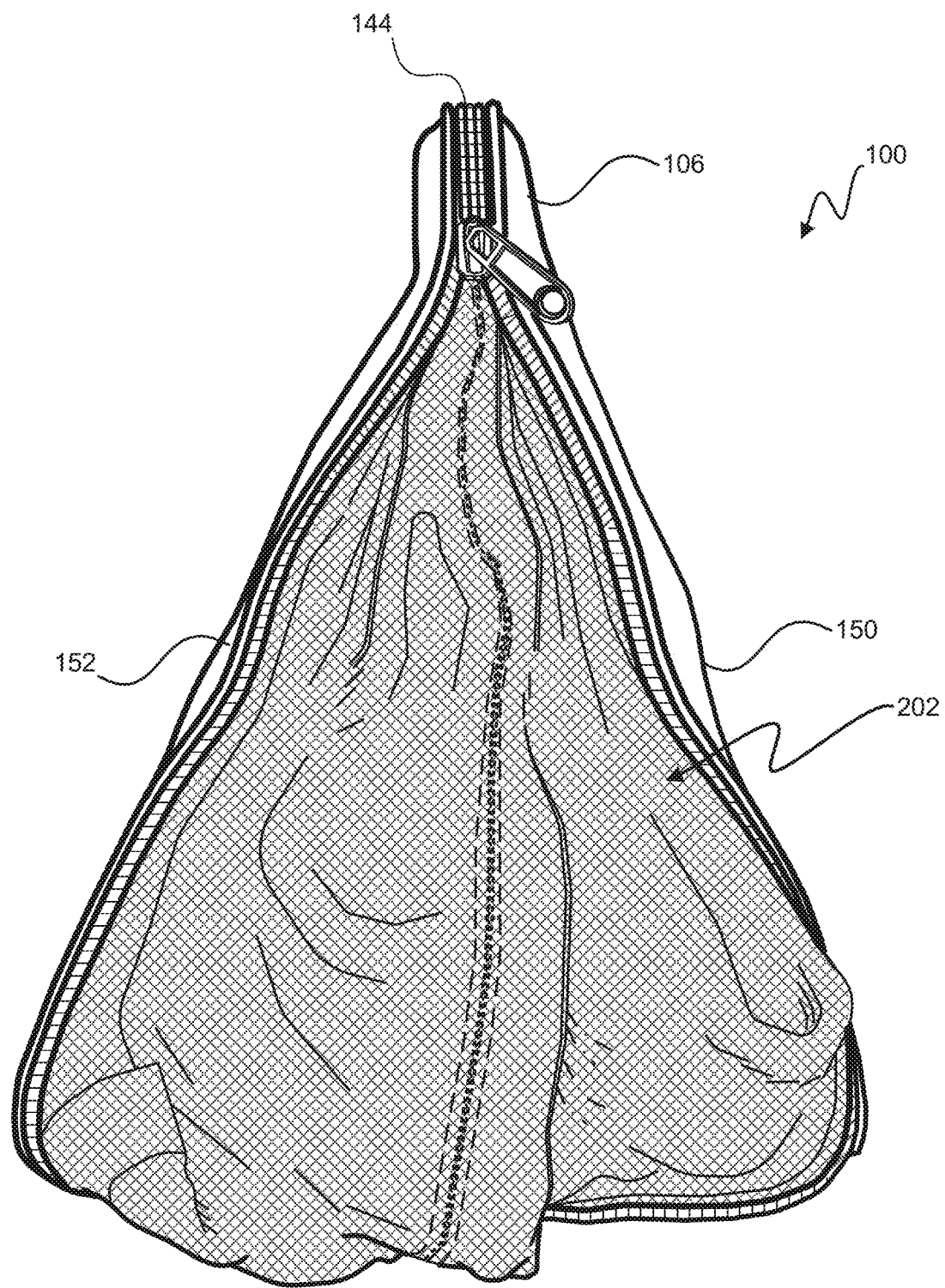
FIG. 2 is a perspective view of one embodiment of a cover transitioning from the first, open position.

With reference now to FIG. 2, a perspective view of one embodiment of the cover 100 during transition between the first, open position and the second, closed position is shown. In the embodiment depicted in FIG. 2, the fastener system 144, which is a zipper, partly connects the first portion 150 to the second portion 152 of the front 106 of the cover 100. As seen in FIG. 2, the connection via the fastener system 144 of the first portion 150 to the second portion 152 of the front 106 of the cover 100 creates an internal volume 202 within the front 106 of the cover 100. As depicted in FIG. 2, the back 104 and the side 108 of the cover 100 can be received within the internal volume 202 defined by the front 106.

Figure 3:
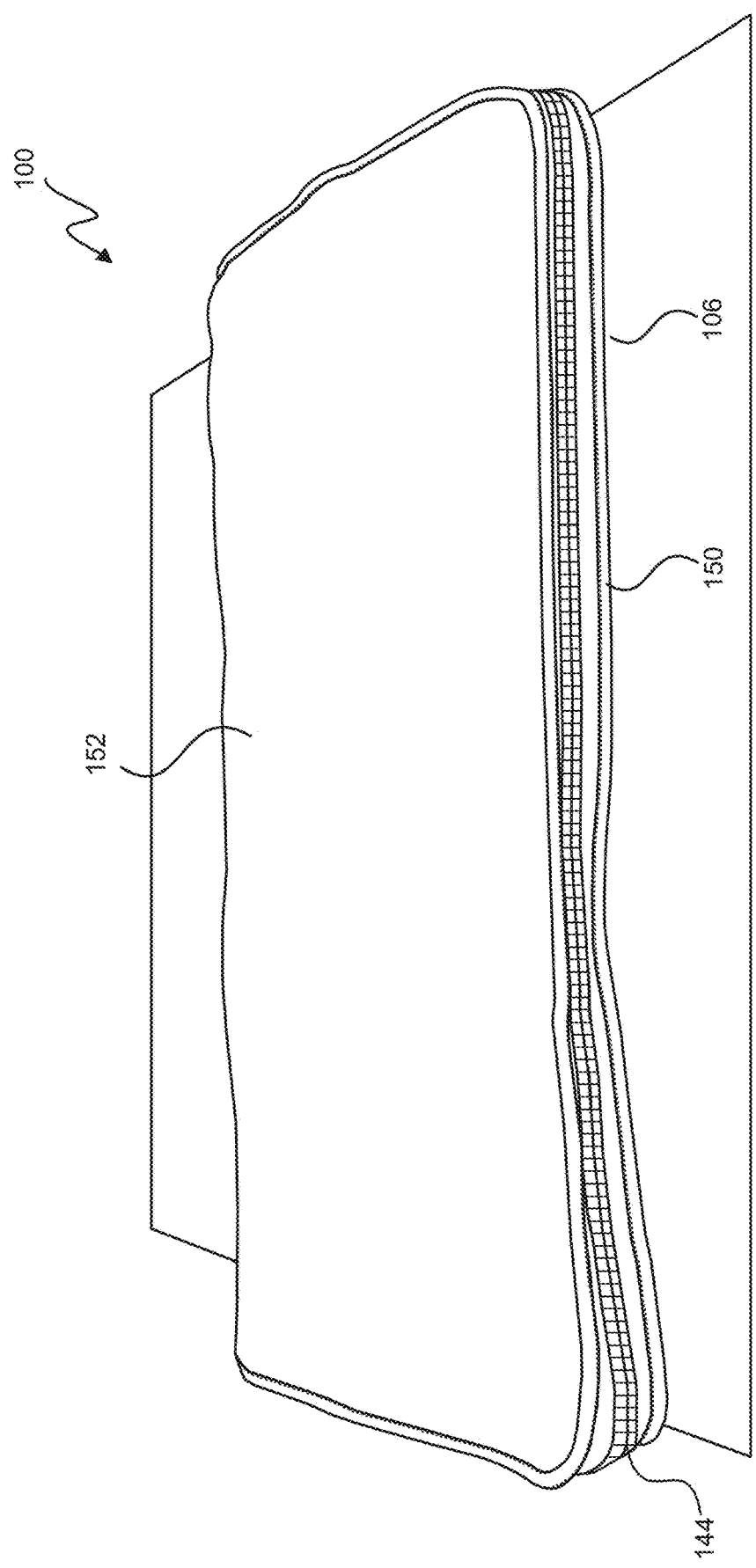
FIG. 3 is a perspective view of one embodiment of a cover in a second, closed position.

With reference now to FIG. 3, a perspective view of one embodiment of the cover 100 and the second, closed position is shown. As seen FIG. 3, the fastener system 144, which is a zipper, is closed so as to fasten the first portion 150 to the second portion 152 of the front 106 of the cover. This positioning of the fastener system 144 creates an internal volume 202 within the front 106 of the cover 100, which internal volume 202 contains the back 104 and the side 108 of the cover.

Figure 4:
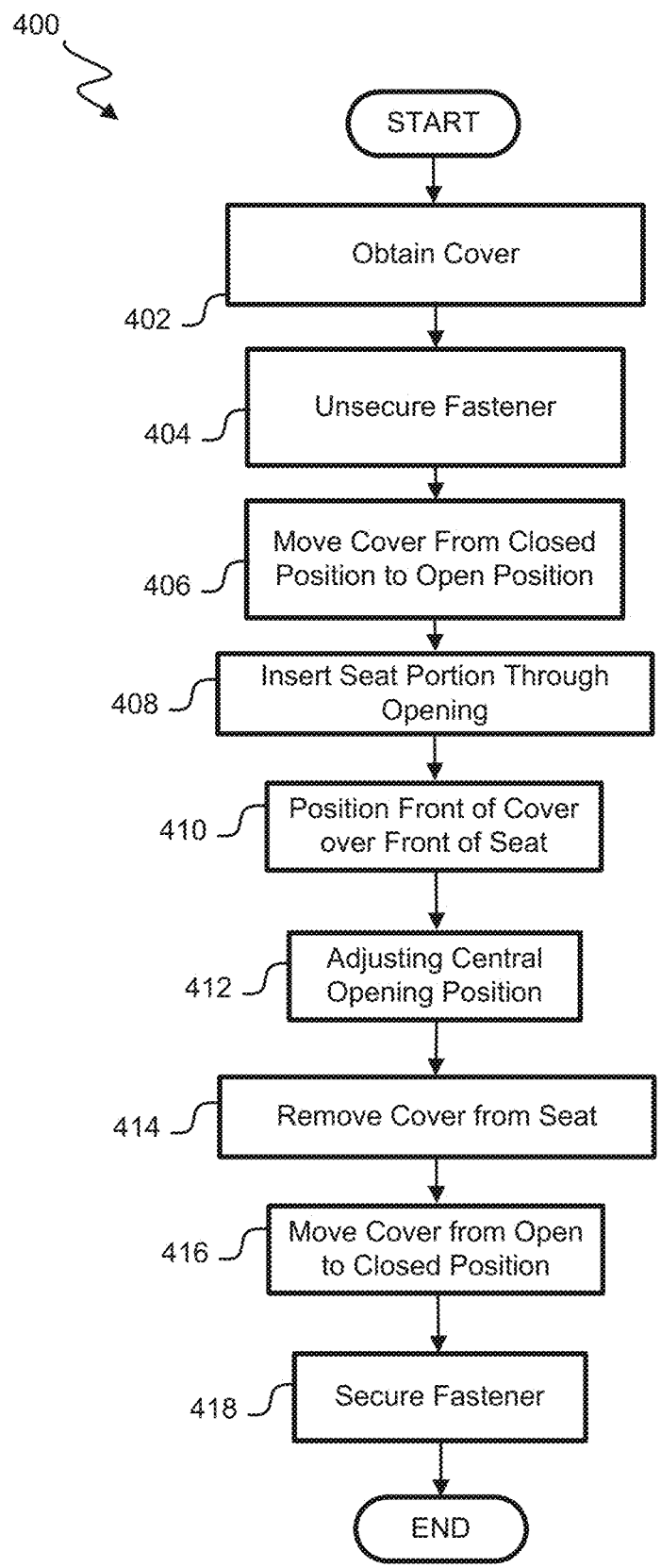
FIG. 4 is a flowchart illustrating one embodiment of a process for using a cover in connection with a seat.

With reference now to FIG. 4, a flowchart illustrating one embodiment of a process 400 for creating a clean seating environment is shown. In some embodiments, the process 400 can be performed using the cover 100 and the seat 102. The process 400 begins at block 402 when the cover 100 is obtained. After the cover has been obtained, the process 400 proceeds block 404 wherein the fastener system 144 is unsecured. In some embodiments in which the fastener system 144 is a zipper, the securing of the fastener system 144 can include moving the zipper from the closed position to an open position.

After the fastener system 144 has been unsecured, the process 400 proceeds to block 406 wherein the cover 100 is moved from the second, closed position to the first, open position. In some embodiments, this can include removing the back 104 and the side 108 of the cover 100 from the internal volume defined by the front 106. After the cover 100 has been moved from the second, closed position to the first, open position, the process 400 proceeds to block 408 wherein a portion of the seat 102 is inserted through the opening 142 of the cover 100. In some embodiments, the portion of the seat 102 that is inserted through the opening 142 of the cover 100 can be inserted into the internal volume of the cover 100, which internal volume is defined by the opening 142, the back 104, the front 106, and the side 108 of the cover 100. In some embodiments, the portion of the seat 102 that is inserted through the opening 142 of the cover 100 can be, for example, the headrest portion of the seat. After a portion of the seat 102 has been inserted through the opening 142 of the cover 100, the process 400 proceeds to block 410 wherein the front 106 of the cover 100 is positioned on the front of the seat 102.

After the front 106 of the cover 100 has been positioned on the front of the seat 102, the process 400 proceeds to block 412 wherein the position of the central opening 118 is adjusted. In some embodiments, the adjustment of the position of the central opening 118 can include moving the cover such that any desired portion of the seat 102, and particularly any desired portion of the back of the seat 102 such as, for example, a media device, is accessible through the central opening 118. In some embodiments, the positioning of the central opening 118 can include an adjustment of the size of the central opening 118 and/or of the size of the opening 142. In some embodiments, the adjustment of the size of the central opening 118 and/or the size of the opening 142 can be made by adjusting the length of the connecting member. In some embodiments, the positioning of the central opening 118 can further include the positioning of the support member 300. After the central opening 118 has been positioned, the process 400 proceeds to block 414 wherein the cover 100 is removed from the seat 102. In some embodiments, this can include removing portions of the seat 100 to the internal volume of the cover 100.

After the cover 100 has been removed from the seat 102, the process 400 proceeds to block 416 wherein the cover 100 is moved from the first, open position to the second, closed position. In some embodiments, for example, this can include the manipulation of the front 106 of the cover 100 so as to create an internal volume within the front 106 of the cover 100, which internal volume is bounded by the first and second portions 150, 152 of the front 106. In some embodiments, this step can further include the placement of and/or insertion of the back 104 and the side 108 of the cover 100 within the internal volume defined by the first and second portions 150, 152 of the front 106. After the cover 100 has been moved from the first, open position to the second, closed position, the process 400 proceeds to block 418 wherein the fastener system 144 is secured. In some embodiments in which the fastener system 144 is a zipper, the securing of the zipper can entail moving the zipper from the open position to the closed position.

While the principles of the disclosure have been described above in connection with specific apparatuses and methods, it is to be clearly understood that this description is made only by way of example and not as limitation on the scope of the disclosure.

What is claimed is:

1. A seat cover comprising:
    a headrest comprising a front face, a front interior, a front top, a front base, a front first side, and a front second side;
    a back comprising a rear face defining a central opening, a back interior, a back top, a back base, a back first side, and a back second side, wherein a portion of the seat is accessible through the central opening;
    a side connecting the headrest and the back and extending around the front first side, the front top, the front second side, the back first side, the back top, and the back second side, wherein the headrest, the back, and the side define an internal volume having an opening at the base of the headrest and the base of the back; and
    a fastener system extending around portions of the headrest, wherein the fastener system is moveable between a first closed position and a second open position, wherein the fastener system is moveable to the first closed position when the back and the side are received within a volume defined by the headrest.

2. The seat cover of claim 1, wherein the fastener system comprises a zipper.

3. The seat cover of claim 2, wherein the zipper comprises:
    a first zipper half extending around portions of three of the front top, the front base, the front first side, and the front second side;
    a second zipper half extending around portions of three of the front top, the front base, the front first side, and the front second side.

4. The seat cover of claim 3, wherein the first and second zipper halves are positioned so that at least one of the zipper halves extends around portions of each of the front top, the front base, the front first side, and the front second side.

5. The seat cover of claim 4, wherein the first zipper half extends around a first half of the perimeter of the headrest and the second zipper half extends around a second half of the perimeter of the headrest.

6. The seat cover of claim 1, wherein the headrest is smaller than the back.

7. The seat cover of claim 1, wherein at least one of the headrest, the back, and the side comprises an elastic material.

8. The seat cover of claim 1, wherein at least one of the headrest, the back, and the side comprises an antimicrobial material.

9. The seat cover of claim 1, wherein at least one of the headrest, the back, and the side comprise poly-spandex.

10. A method of creating a sterile sitting environment, the method comprising:

obtaining a seat cover comprising:
- a headrest comprising a front face, a front interior, a front top, a front base, a front first side, and a front second side;
- a back comprising a back face, a back interior, a back top, a back bottom, a back first side, and a back second side, wherein the back defines a central opening, wherein a portion of the seat is accessible through the central opening;
- a side connecting the headrest and the back and extending around the front first side, the front top, the front second side, the back first side, the back top, and the back second side, wherein the headrest, the back, and the side define an internal volume opening at the base of the headrest and the bottom of the back; and
- a fastener system extending around portions of the headrest, wherein the fastener system is moveable between a closed position and an open position, wherein the fastener system is moveable to the closed position when the back and the side are received within a volume defined by the headrest;

moving the fastener system from the closed position to the open position; and placing the seat cover over a top portion of a seat such that the headrest extends across a front of the seat.

11. The method of claim 10, wherein placing the seat cover of the top portion of the seat comprises removing the back and the side from the volume defined by the headrest.

12. The method of claim 10, wherein placing the seat cover of the top portion of the seat further comprises receiving the top of the seat within the internal volume defined by the headrest, the back, and the side.

13. The method of claim 12, wherein receiving the top of the seat within the internal volume defined by the headrest, the back, and the side comprises inserting the top of the seat through the internal volume opening at the base of the headrest and the bottom of the back.

14. The method of claim 10, further comprising removing the seat cover from the top portion of the seat.

15. The method of claim 14, further comprising placing the back and the side in the volume defined by the headrest, and moving the fastener from the open position to the closed position.

16. The method of claim 15, further comprising positioning the central opening over a media device on the seat such that the media device is accessible and viewable through the central opening.

17. A seat cover comprising:
- a headrest comprising a front top, a front base, a front first side, and a front second side;
- a back comprising a back top, a back base, a back first side, and a back second side, wherein the back is smaller than the headrest, wherein the back defines a central opening, wherein a portion of the seat is accessible through the central opening;
- a side connecting the headrest and the back and extending around the front first side, the front top, the front second side, the back first side, the back top, and the back second side, wherein the headrest, the back, and the side define an internal volume opening at the base of the headrest and the base of the back; and
- a zipper extending around the perimeter of the headrest, the zipper having a first half extending around portions of three of the front top, the front base, the front first side, and the front second side, and a second half extending around portions of three of the front top, the front base, the front first side, and the front second side, wherein the zipper is moveable between a closed position and an open position, and wherein the zipper is moveable to the closed position when the back and the side are within a volume defined by the headrest.

18. The seat cover of claim 17, wherein the first and second zipper halves are positioned so that at least one of the zipper halves extends around portions of each of the front top, the front base, the front first side, and the front second side.

19. The seat cover of claim 18, wherein at least one of the headrest, the back, and the side comprise poly-spandex.

* * * * *